(12) United States Patent
Gidvani (10) Patent No.: US 8,620,312 B2
(45) Date of Patent: Dec. 31, 2013

(54) COMBINED BACKGROUND AND 20/40 COEXISTENCE SCAN

(75) Inventor: Ravi H. Gidvani, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 12/652,614

(22) Filed: Jan. 5, 2010

(65) Prior Publication Data

US 2011/0165873 A1 Jul. 7, 2011

(51) Int. Cl.
*H04W 4/00* (2009.01)
*H04Q 1/30* (2006.01)

(52) U.S. Cl.
USPC .................. 455/434; 455/161.1; 455/166.1; 455/435.2; 455/435.3; 455/422.1; 340/7.42

(58) Field of Classification Search
USPC .......... 455/434, 435.2, 435.3, 166.1; 340/7.2, 340/742, 7.42; 348/423.1
See application file for complete search history.

(56) References Cited

U.S. PATENT DOCUMENTS

| | | | |
|---|---|---|---|
| 2001/0019956 A1* | 9/2001 | Tada | 455/434 |
| 2005/0288015 A1* | 12/2005 | Azizi et al. | 455/434 |
| 2007/0060162 A1 | 3/2007 | Xhafa et al. | |
| 2009/0310618 A1 | 12/2009 | Carter | |

FOREIGN PATENT DOCUMENTS

| | | | |
|---|---|---|---|
| EP | 1608107 A1 | 12/2005 | |
| WO | WO2009060275 A2 | 5/2009 | |

OTHER PUBLICATIONS

IEEE P802.11 nTM/Dg.0 Draft Standard for information Technology—Telecommunications and information exchange between systemsm Local and metropolitan area networksm Specific requirements Part 11: Wireless LAN Medium Access Control (MAC) and Physical Layer (PHY) specifications.*
"Local and Metropolitan Area Networks-Specific Requirements", IEEE Std 802.11-2007, Part 11: Wireless LAN MAC and PHY Specifications, pp. 436-443, Section 11.1.3.
"Restrictions on non-AP STAs that are not a member of an infrastructure BSS", IEEE P802.11n/D7.0, Sep. 2008, pp. 229-230. Sections 11.14.5.

(Continued)

*Primary Examiner* — George Eng
*Assistant Examiner* — Inder Mehra
(74) *Attorney, Agent, or Firm* — Kevin T. Cheatham (57) ABSTRACT

A scanning module within a non-AP station receives first scan parameter values for performing a first type of scan to obtain a first type of information, and receives second scan parameter values for performing a second type of scan to obtain a second type of information. From the first and second parameter values the scanning module determines combined scan parameter values that satisfy scan requirements for both types of scans. The combined scan parameter values are used to control a sequence of combined scans. A combined scan yields both the first and second type of information. In one example, an IEEE 802.11(n) non-AP station receives 20/40 coexistence scan parameters. The 20/40 parameters and locally-generated background scan parameters are used to determine parameters for performing combined background and 20/40 scans. Reducing the number of scans using combined scans has advantages including increasing data throughput, freeing processing resources, and reducing power consumption.

24 Claims, 10 Drawing Sheets (56) References Cited

OTHER PUBLICATIONS

IEEE Standard for Information technology-Telecommunications and information exchange between systems-Local and metropolitan area networks-Specific requirements Part 11: Wireless LAN Medium Access Control (MAC) and Physical Layer (PHY) Specifications Amendment 5: Enhancements for Higher Throughput, IEEE Standard, IEEE, Piscataway, NJ, USA, Oct. 29, 2009, pp. 1-536, XP017604244, ISBN: 978-0-7381-6046-7.

International Search Report and Written Opinion—PCT/US2010/062067—ISA/EPO—Jun. 8, 2011.

Matthew Fischer, et al., "LB97 20/40 BSS Coexistence", May 24, 2007, pp. 1-17, XP002631119, Retrieved from the Internet: URL: https://mentor.ieee.org/802.11/dcn/07/11-07-1975-00-000n-lb97-20-40-coex-2-4ghz.ppt [retrieved on Apr. 1, 2011] p. 7.

* cited by examiner

20 MHZ WIDE OPERATION
(PRIOR ART)
FIG. 4

40 MHZ WIDE OPERATION
(PRIOR ART)
FIG. 5

NON-AP SCANNING
(PRIOR ART)

FIG. 6

ACTIVE SCANNING
(PRIOR ART)

FIG. 7

PASSIVE SCANNING
(PRIOR ART)

| OBSS PARAMETER (20/40 SCAN CONTROL PARAMETER) | VALUE (ms) | |
|---|---|---|
| dot11OBSSScanPassiveDwell | 100 | ← 141 |
| dot11OBSSScanActiveDwell | 20 | ← 142 |
| dot11OBSSScanPassiveTotalPerChannel | 200 | ← 143 |
| dot11OBSSScanActiveTotalPerChannel | 40 | ← 144 |
| dot11OBSSWidthTriggerScanInterval | 1000 | ← 145 |

FIG. 15

| BACKGROUND SCAN CONTROL PARAMETER | VALUE (ms) | |
|---|---|---|
| BackgroundScanPassiveDwell | 100 | ← 146 |
| BackgroundScanActiveDwell | 20 | ← 147 |
| BackgroundScanPassiveTotalPerChannel | 200 | ← 148 |
| BackgroundScanActiveTotalPerChannel | 40 | ← 149 |
| BackgroundWidthTriggerScanInterval | 2000 | ← 150 |

COMBINED BACKGROUND AND 20/40 COEXISTENCE SCAN

BACKGROUND INFORMATION

1. Technical Field

The disclosed embodiments relate to scanning mechanisms in wireless networks, and more particularly to scanning mechanisms in IEEE 802.11(n) wireless networks.

2. Background Information

An IEEE 802.11 compliant network has various components that interact with each other to provide connectivity. The basic building block of an 802.11 network is called the Basic Service Set (BSS). There are two basic modes of BSS operation: the adhoc mode, and the infrastructure mode. The mode of operation that is commonly used to provide connectivity is infrastructure mode.

Figure 1:
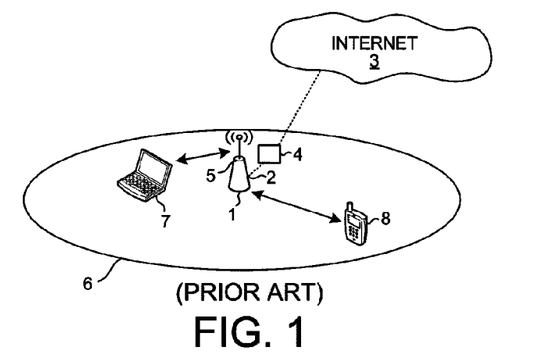
FIG. 1 (Prior Art) is a diagram of infrastructure mode BSS operation.

FIG. 1 (Prior Art) is a diagram of infrastructure mode BSS operation. A device 1, referred to here as an Access Point station (AP station) includes two physical interfaces. The first physical interface 2 is for connecting the AP station to another network, such as the internet 3. This connection is generally a wired connection and generally extends through other networking equipment 4 as illustrated. The second interface 5 of the AP station is a wireless interface involving a Radio Frequency (RF) transceiver. The wireless interface provides a coverage area 6. Other devices 7 and 8 having similar wireless interfaces, that are located within the coverage area 6 of the AP station, can engage in wireless RF communications with the AP station. These other devices 7 and 8 are referred to here as non-AP stations. An example of a non-AP station is laptop computer 7 that has a Wi-Fi network interface card (NIC). Wi-Fi is a tradename of a Wi-Fi Alliance of companies. Designating a device to be a Wi-Fi certified device indicates that the device complies with a certain subset of IEEE 802.11 standards. The Wi-Fi NIC of non-AP station 7 in FIG. 1 provides the user of the laptop computer with connectivity to the external world and the internet via AP station 1. In the illustrated example, a similar Wi-Fi functionality is also integrated into a mobile communication device such as cellular telephone 8.

In the infrastructure mode, the AP station typically comes up first, starts a BSS, and periodically broadcasts a special frame called a "beacon." When a non-AP station is first powered up, the non-AP station is to discover an AP station that the non-AP station can connect to. This process of discovering an AP station involves listening for transmissions in a process called scanning. There are two scanning methods: active scanning, and passive scanning. In the case of active scanning, the non-AP station broadcasts a frame called "probe request". Any AP station that receives the probe request responds to the probe request by transmitting back a response frame called a "probe response" frame. The non-AP station receives the probe response frame from an AP station that it wants to connect to and, depending on internal logic of the non-AP station, connects to the AP station in a process called "association." The scanning that occurs before association to locate a suitable AP station is called foreground scanning.

Figure 2:
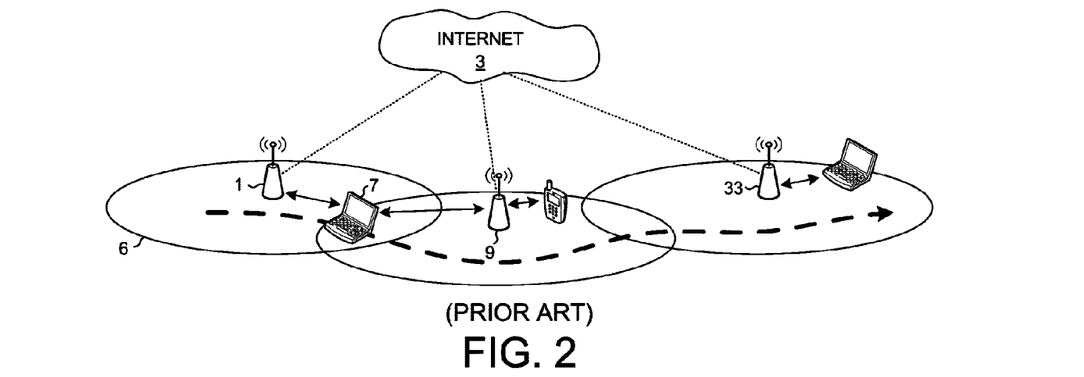
FIG. 2 (Prior Art) is a diagram that illustrates how a mobile non-AP station 7 may move from the coverage area of one AP station to the coverage area of another AP station in what is called "roaming"
Figure 3:
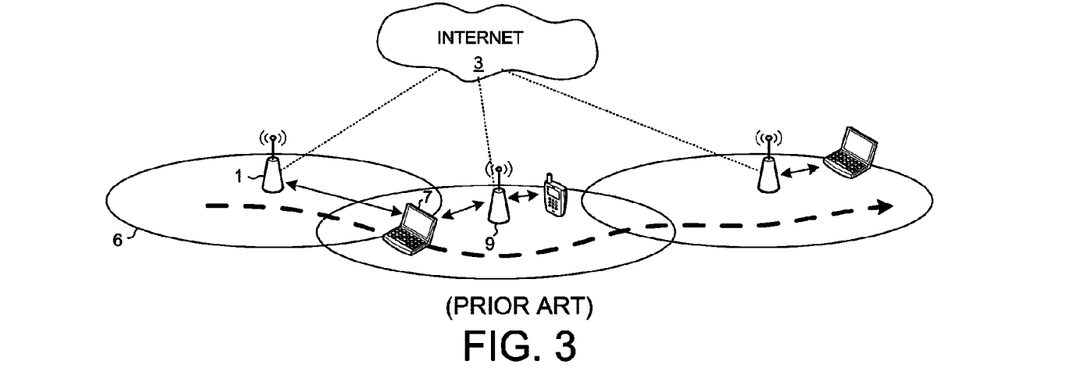
FIG. 3 (Prior Art) illustrates non-AP station 7 at the point of handover from one AP station to another AP station.

FIG. 2 (Prior Art) is a diagram that illustrates how a mobile non-AP station 7 may move from the coverage area of one AP station to the coverage area of another AP station in what is called "roaming" A user may, for example, be using non-AP station 7 to access the internet through AP station 1. The user may then move away from AP station 1 and toward AP station 9, but may want to maintain connectivity to the Internet 3. As non-AP station 7 moves, the wireless communication link between non-AP station 7 and AP station 1 becomes weaker and weaker and the link between non-AP station 7 and AP station 9 becomes stronger and stronger. At some point in the movement, the connection to the internet 3 should handover so that it is no longer provided through AP station 1 but rather is provided through AP station 9. FIG. 3 (Prior Art) shows the point of this handover. Because non-APs may be roaming, non-AP stations may continue to scan after association in a process called "background" scanning. In the background, the non-AP stations continuously scan to maintain updated information on the strength of possible communication links to the various AP stations. Non-AP station 7 may, for example, perform background scanning a periodic intervals so that it maintains an updated and separate indication of signal strength from non-AP station 7 to each of the AP stations 9 and 33.

Figure 4:
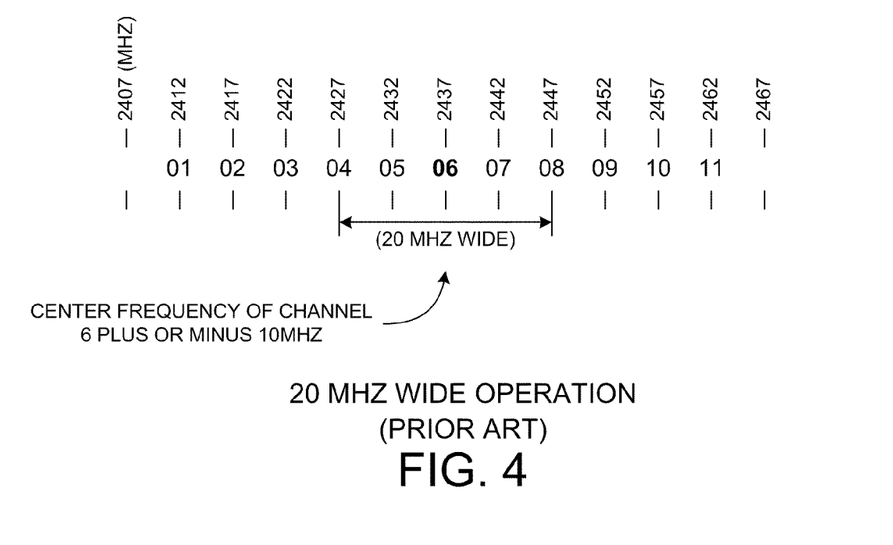
FIG. 4 (Prior Art) illustrates a 20 MHz wide channel.

Another reason to do scanning involves a channel. Generally speaking, a channel is a separate path through which information signals can flow. In wireless communications, a channel may be a dedicated amount of radio frequency spectrum. The radio frequency spectrum channels that can be used are governed by local regulations. In the United States, for example, there are eleven channels in the 2.4 GHz frequency band utilized by Wi-Fi devices. Channel 6, for example, is 2.437 GHz (or 2437 MHz). The center frequencies of these eleven channels are located on 5 MHz intervals. Wi-Fi signals are, however, 20 MHz wide. FIG. 4 (Prior Art) illustrates Wi-Fi channel 6. Although the channel (channel 6) is centered at 2437 MHz, the channel is 20 MHz wide. The channel extends from 2427 MHz to 2447 MHz.

Figure 5:
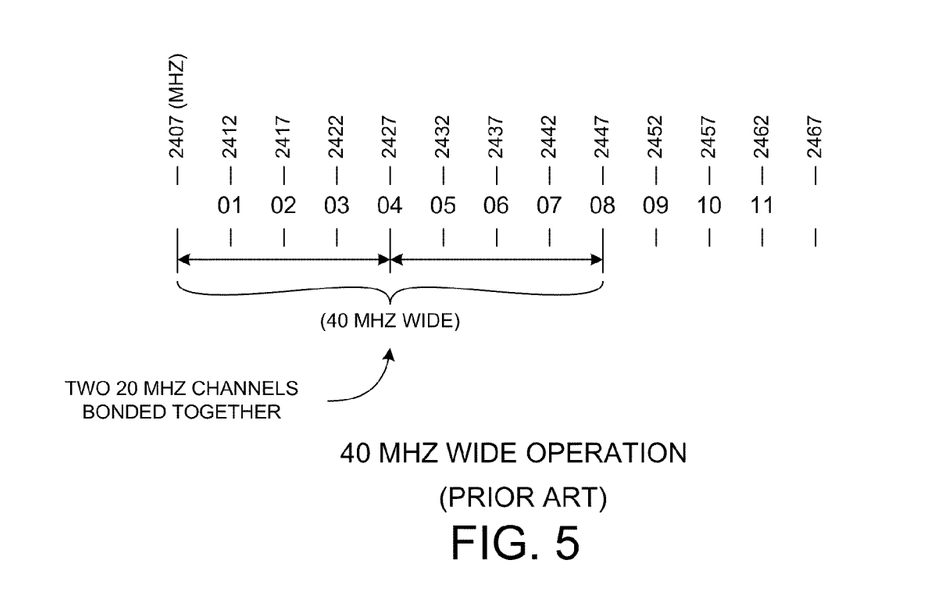
FIG. 5 (Prior Art) illustrates a 40 MHz wide channel (two bonded 20 MHz wide channels).

FIG. 5 (Prior Art) illustrates a way that an AP station can provide increased communication throughput. In accordance with IEEE 802.11(n), two adjacent 20 MHz channels are combined (bonded) in order to provide 40 MHz of usable bandwidth. In IEEE 802.11(n), an AP station can use either 20 MHz wide channels or 40 MHz wide channels. An AP station using wider 40 MHz channels, however, may cause operating problems for other devices that might be sharing the same 2.4 GHz band as the IEEE 802.11 devices. In the 2.4 GHz band there is a very limited number of channels available (only eleven in the United States). Using wide 40 MHz channels may consume so many of the channels for the 802.11 devices that there may not be enough free channels left for use by other devices of other protocols that are trying to share the same 2.4 GHz band with the 802.11(n) devices. Moreover, the tight 5 MHz spacing between the eleven channels may introduce problems. If wide 40 MHz channels are being used, then it may be necessary to place the channels used by other non-802.11 devices closer to the 40 MHz wide channel than would otherwise be necessary were a narrower 20 MHz wide channel used. Due to the closer spacing of channels, interference may occur between the non-802.11 devices and the 802.11 devices.

To minimize these problems, a mechanism referred to as the 20/40 coexistence has been proposed. When a first AP station comes up and starts a BSS using 40 MHz wide channels, the first AP station begins checking at certain intervals to determine if other devices may be present which cannot tolerate the 40 MHz operation of the first AP station. A bluetooth functionality may, for example, be incorporated into or associated with a second AP station. Once the first AP station has started its BSS, it will mandate that all its non-AP stations perform 20/40 coexistence scanning. The non-AP stations then perform scanning and report back the results of the scanning to the first AP station. If one of the non-AP stations receives a communication from the second AP station indicating that the bluetooth portion of the second AP station cannot tolerate 40 MHz operation, then the non-AP station will be able to report this condition back to the first AP station. The first AP station in turn may stop using 40 MHz wide channels in order to prevent unwanted interference with operation of the bluetooth functionality of the second AP station.

Figure 6:
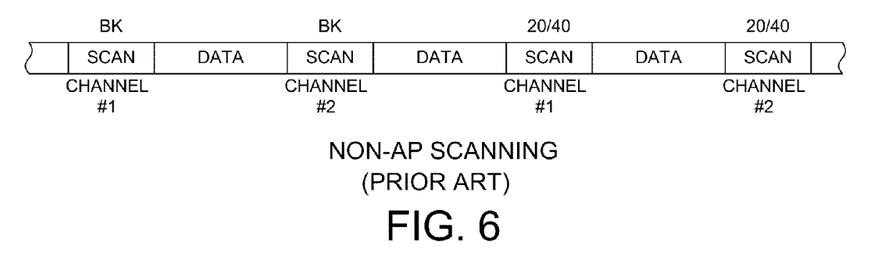
FIG. 6 (Prior Art) is a simplified timeline diagram of operation of a non-AP station when performing background and 20/40 scanning.

FIG. 6 (Prior Art) is a simplified timeline diagram of operation of non-AP station 7. Data traffic is being communicated between non-AP station 7 and AP station 1 of the BSS using one of the channels. Data traffic on this channel is then interrupted so that the non-AP station can perform a background scan (BK) of a first channel. The non-AP station receives communications from AP stations on this first channel, and from these communications makes an assessment of the quality of possible links between the non-AP station and each of transmitting AP stations. An assessment of the quality of a link may, for example, involve a signal strength determination. Non-AP station 7 then returns to the data traffic communication on the data traffic channel. After an amount of time, the non-AP station performs a second background scan. The second background scan is of another channel. From the incoming communications from AP stations on that channel, the non-AP station 7 makes an assessment of the quality of possible links between non-AP station 7 and each of the AP stations using this other channel. After the second background scan, non-AP station 7 returns to data traffic communication on the data traffic channel. In this way, the non-AP station scans each of the eleven channels at periodic intervals and thereby determines signal strength to each of the AP stations. Non-AP station 7 uses signal strength information obtained from background scans to determine whether to handover from one AP station to another AP station.

In addition, as illustrated in FIG. 6, non-AP station 7 performs periodic scans to determine whether the AP station's use of 40 MHz wide channels is adversely affecting other devices. In the illustration of FIG. 6, non-AP station 7 performs a 20/40 scan of the first channel. The non-AP station determines whether a 40 MHz intolerant device is present by monitoring the status of a "40 MHz intolerant" bit in an incoming frame from an AP station. After receiving incoming frames from AP stations on this first channel, and after checking the 40 MHz intolerance bit settings of the incoming frames, the non-AP station 7 reverts to the data communication channel and communicates additional data traffic. After an amount of time, the non-AP station 7 then 20/40 scans the next channel and checks the 40 MHz intolerant bit settings of any AP stations transmitting on this channel. One by one, the non-AP station performs 20/40 scans of each of the eleven channels. Non-AP station 7 uses 20/40 coexistence scan results to determine whether to employ 40 MHz wide channels.

Figure 7:
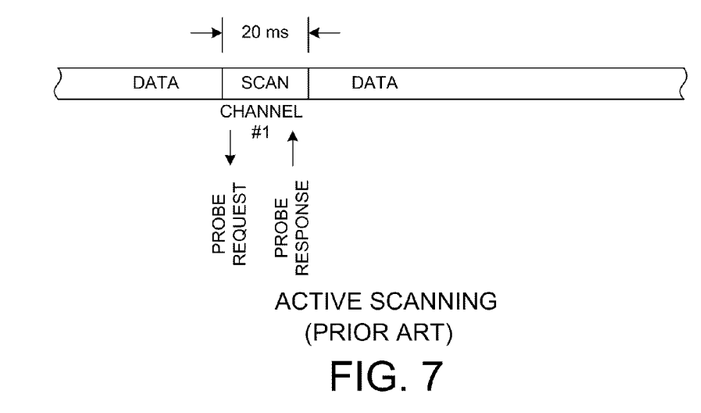
FIG. 7 (Prior Art) is a diagram that illustrates active scanning.

FIG. 7 (Prior Art) shows a way that active scanning can be carried out. The non-AP station transmits a probe request frame. All AP stations on this channel that receive the probe request frame then respond by sending back probe response frames before twenty milliseconds (default value) have expired. After listening for twenty milliseconds (default value), the non-AP station stops the scan operation and reverts to communicating data traffic on the data traffic channel.

Figure 8:
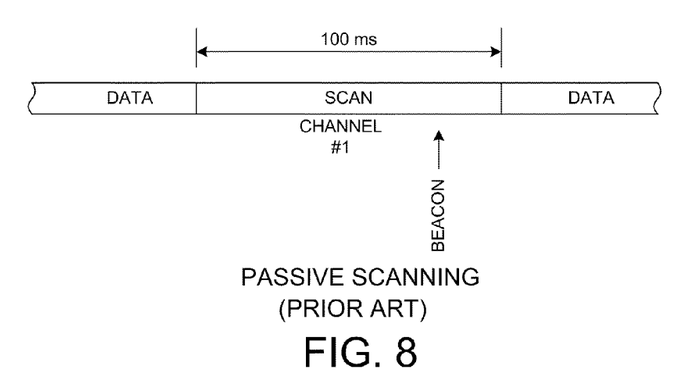
FIG. 8 (Prior Art) is a diagram that illustrates passive scanning.

FIG. 8 (Prior Art) shows a way that passive scanning can be carried out. The non-AP station merely listens to the designated channel. AP stations that are using the channel are to transmit periodic unsolicited beacon frames. A beacon frame may be received at any time in the listening period. After listening for one hundred milliseconds (default value), the non-AP station stops the scan operation and reverts to communicating data traffic on the data traffic channel.

SUMMARY

A scanning module within a non-AP station receives first scan parameter values for performing a first type of scan to obtain a first type of information, and receives second scan parameter values for performing a second type of scan to obtain a second type of information. From the first and second parameter values, the scanning module applies a function to determine a set of combined scan parameter values. The set of combined scan parameter values if employed to control scanning will satisfy scan timing requirements for both types of scans. The combined scan parameter values are then used by the non-AP station to initiate a multi-channel combined scan operation in which one or more combined scans is performed on each channel. A combined scan yields information of both the first type and of the second type. Use of combined scans in this way may result in a reduced the number of scans, and may allow increased data traffic throughput and/or reduced power consumption. One of the combined scan parameter values, referred to here as the "multi-channel combined scan interval value," determines the interval of time between successive ones of these multi-channel combined scan operations.

In one example, an IEEE 802.11(n) non-AP station receives a set of 20/40 coexistence scan parameter values from an AP station to which the non-AP station is connected. The non-AP station also has access to a set of locally-generated background scan parameter values. The 20/40 coexistence scan parameter values and the background scan parameter values are both supplied to a novel scanning module within the non-AP station. The novel scanning module applies a function to determine a set of combined scan parameter values for controlling combined scans. The function uses as inputs the 20/40 coexistence scan parameter values and the background scan parameters values, as well as an optional 20/40 enable bit and optional data traffic information.

In one example, one of the combined scan parameter values (the "multi-channel combined scan interval value") is based at least in part on one of the 20/40 coexistence scan parameter values (for example, the "20/40 multi-channel scan interval value") and one of the background scan parameter values (for example, the "background multi-channel scan interval value"). The function involves setting the multi-channel combined scan interval value to be the smaller of the 20/40 multi-channel scan interval value and the background multi-channel scan interval value. In another more complex example, the function involves setting the multi-channel combined scan interval value to be the smaller of the 20/40 multi-channel scan interval value and the background multi-channel scan interval value, where the 20/40 multi-channel scan interval value is ignored if a 20/40 enable bit is not set, and where the background multi-channel scan interval value was itself previously adjusted based on an amount of data traffic being handled by the non-AP station. In the more complex example, the function has at least four inputs: the 20/40 multi-channel scan interval value, the background multi-channel scan interval value, the 20/40 enable bit, and the amount of data traffic. The function may also have other inputs.

The resulting combined scan control parameter values as output by the function are then used to initiate, time and control a multi-channel combined scan operation performed by the non-AP station, where combined scans of all channels are performed to satisfy both 20/40 coexistence scan requirements as well as background scan requirements. In one example, each combined scan generates 20/40 coexistence scan results as well as background scan results. One of the combined scan control parameter values, the multi-channel combined scan interval value, determines the interval of time between successive ones of these multi-channel combined scan operations.

In a first novel aspect, the number of scans that the non-AP station must perform is reduced using combined scans as compared to using a conventional scanning mechanism that does not involve combined scans. Reducing the number of scans has advantages including increasing data traffic throughput of the non-AP station, freeing processing resources within the non-AP station, and/or decreasing power consumption of the non-AP station. In a second novel aspect, if the AP station to which the scanning non-AP station is connected is not 20/40 coexistence capable, then the non-AP station does not perform 20/40 scanning operations because results of the 20/40 scanning would not be usable to affect AP station operation. By not performing needless 20/40 scanning, power consumption in the non-AP station is reduced, processing resources are made available for other purposes, and data traffic throughput is increased. In a third novel aspect, if the non-AP station becomes disconnected from its AP station, then the non-AP station will no longer be able to cause the AP station (to which it was connected) to stop using 40 MHz wide channels. Accordingly, 20/40 scanning by the non-AP station is disabled because results of such 20/40 scanning would no longer be usable to affect operation of the AP station. By not performing needless 20/40 scanning, power consumption is reduced, processing resources are made available for other purposes, and data traffic throughput is increased. In a fourth novel aspect, if data traffic is detected to increase in the non-AP station beyond a predetermined amount, then the frequency of background scanning is reduced a commensurate amount to provide more throughput for data traffic. In one example, a 20/40 coexistence scan software module is disabled in response to the non-AP station no longer being connected to a 20/40 capable AP station.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 9:
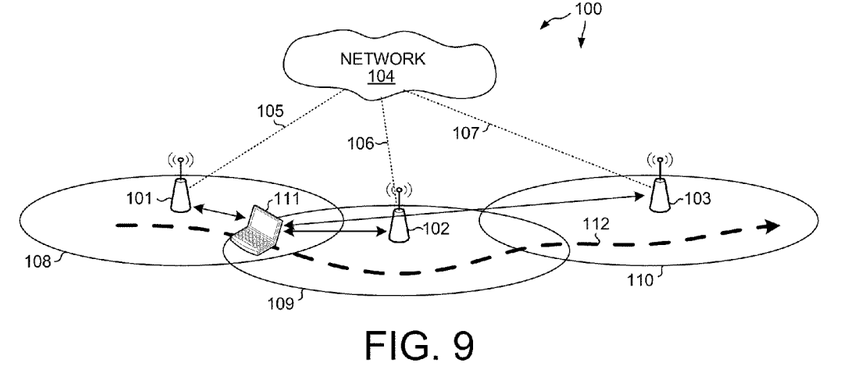
FIG. 9 is a simplified diagram of an IEEE 802.11(n) wireless network system 100 in accordance with one novel aspect.

FIG. 9 is a simplified diagram of an IEEE 802.11(n) wireless network system 100 in accordance with one novel aspect. System 100 includes multiple IEEE 802.11(n) compliant Access Point stations (AP stations) 101-103 that are connected to a network 104. Network 104 may be a Local Area Network or another network, and may be connected directly or indirectly to the Internet. The AP stations are typically connected to network 104 via hardwired connections 105-107. Each of the AP stations has a respective wireless communication coverage cell. For example, AP station 101 has coverage cell 108, AP station 102 has coverage cell 109, and AP station 103 has coverage cell 110. A mobile non-Access Point station (non-AP station) 111 is within coverage cell 108 and is connected to and associated with AP station 101. Non-AP station 111 can be made to roam within the coverage areas 108-110 without breaking communication with network 104. Non-AP station 111 may, for example, roam along a path indicated by the dashed line 112. In the present example, non-AP station 111 is a laptop computer 113 fitted with a Wi-Fi non-AP station dongle 114. In another example, non-AP station 111 is a cellular telephone that has a Wi-Fi functionality.

Figure 10:
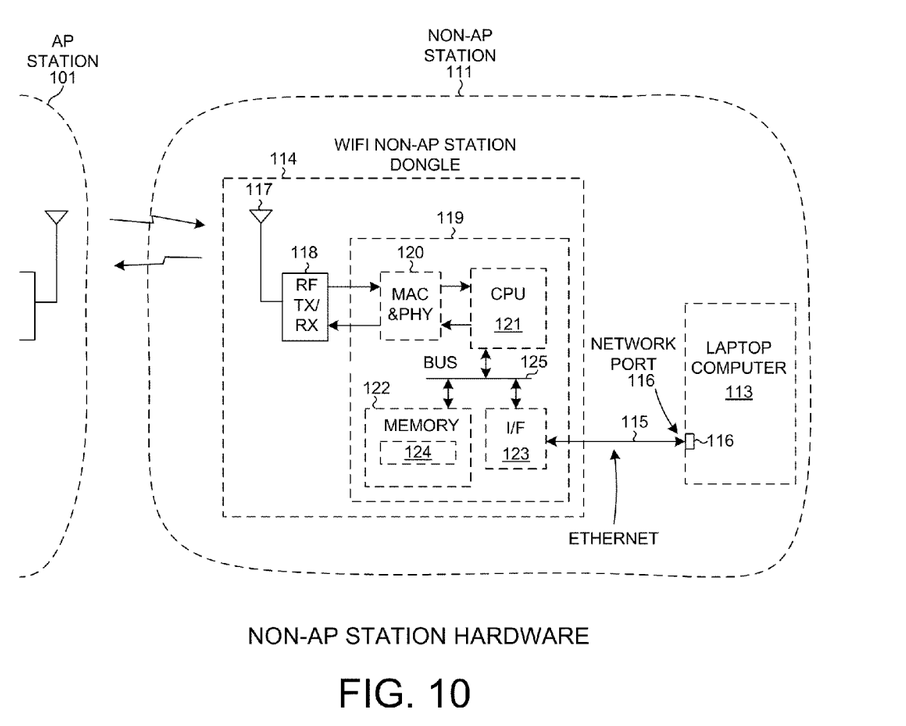
FIG. 10 is a very simplified hardware diagram of the non-AP station 111 in the system of FIG. 9.

FIG. 10 is a very simplified hardware diagram of the non-AP station 111 of FIG. 9. Non-AP station 111 includes the laptop computer 113 and the dongle 114. Dongle 114 is coupled to laptop computer 113 by an Ethernet cable 115 that plugs into an Ethernet port 116 of the laptop computer. Dongle 114 includes, among other parts not illustrated, an antenna 117, a Radio Frequency (RF) transceiver 118, and an integrated circuit 119. Integrated circuit 119 is a computing mechanism that includes, among other parts not illustrated, a MAC and PHY layer hardware core 120, a Central Processing Unit (CPU) 121, an amount of semiconductor memory 122, and Ethernet interface circuitry 123. CPU 121 accesses a set of computer-executable instructions 124 via a local bus 125. Memory 122 is a computer-readable medium that stores the set of computer-executable instructions 124. CPU 121 reads and executes the set of computer-executable instructions 124. Non-AP station 111 can send 802.11(n) frames to AP stations, and can receive 802.11(n) frames from AP stations, via antenna 117. Antenna 117 and RF transceiver 118 together constitute a wireless transceiver mechanism of the non-AP station 111. Ethernet interface circuitry 123 and Ethernet cable 115 are a wired interface of the non-AP station 111. At the particular point in time illustrated in FIG. 9 and FIG. 10, non-AP station 111 is connected to and is associated with AP station 101, but is also communicating 802.11(n) frames to other AP stations 102 and 103. Non-AP station 111 collects information from AP stations 102 and 103 for 20/40 coexistence purposes and for background scanning purposes.

Figure 11:
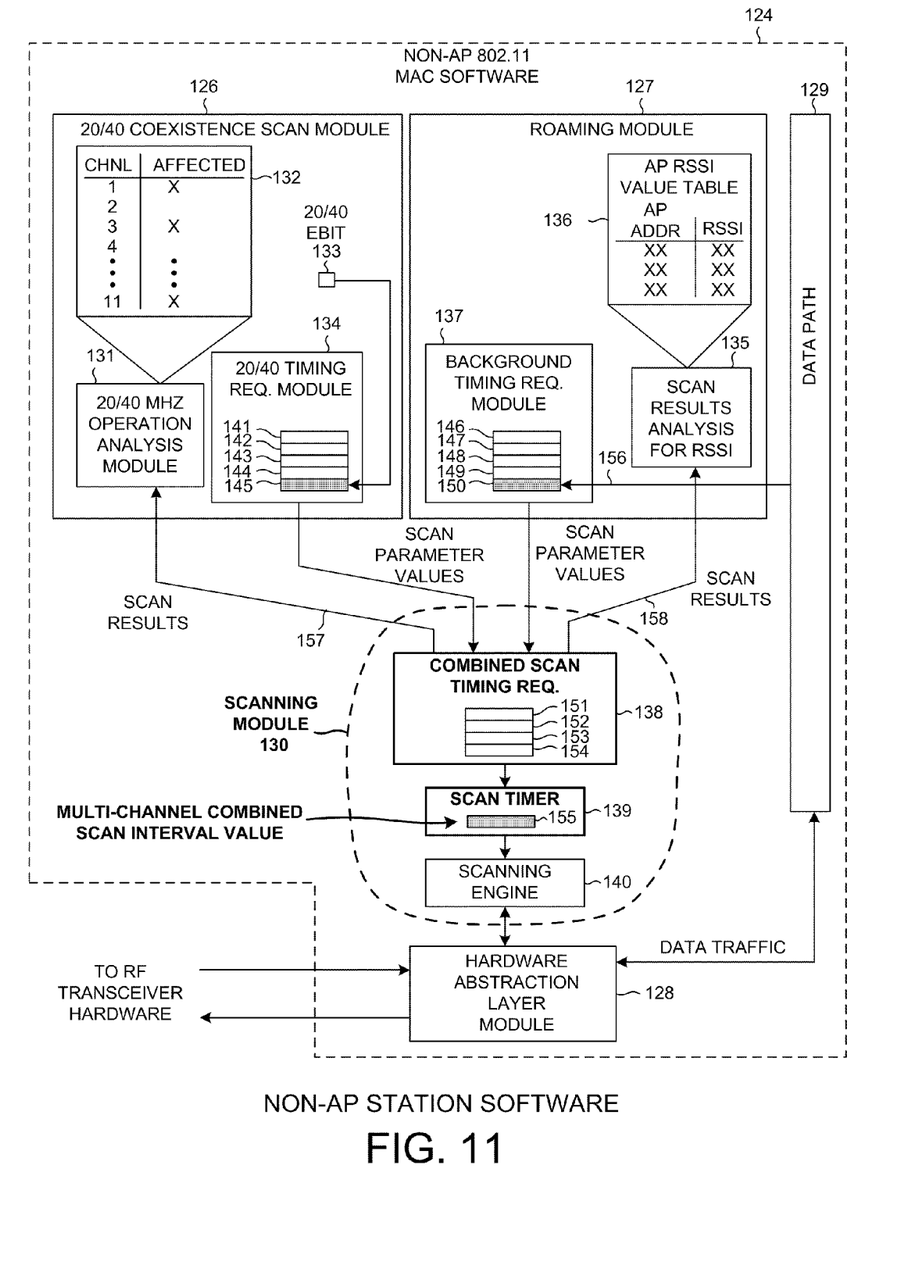
FIG. 11 is a diagram of the structure of software 124 executing on the non-AP station 111 of FIG. 10.

FIG. 11 is a diagram that illustrates the structure of software 124 executing on non-AP station 111. In this specific embodiment, software 124 is non-AP IEEE 802.11 MAC software. Software 124 includes, among other parts not illustrated, a 20/40 coexistence scan module 126, a roaming module 127, a hardware abstraction layer module 128, a data path portion 129, and a novel scanning module 130. 20/40 coexistence scan module 126 in turn includes a 20/40 operation analysis module 131, a table 132, a 20/40 coexistence mode enable bit 133, and a 20/40 timing requirements module 134. Table 132 records the channels that are unduly adversely affected by 40 MHz wide channel operation of AP station 101. Roaming module 127 includes a scan results analysis module 135, a table 136, and a background timing requirements module 137. Table 136 maintains an indication of the signal strength of possible links between the non-AP station 111 and other AP stations. Scanning module 130 includes a combined scan timing requirement module 138, a scan timer 139, and a scanning engine 140.

Figure 12:
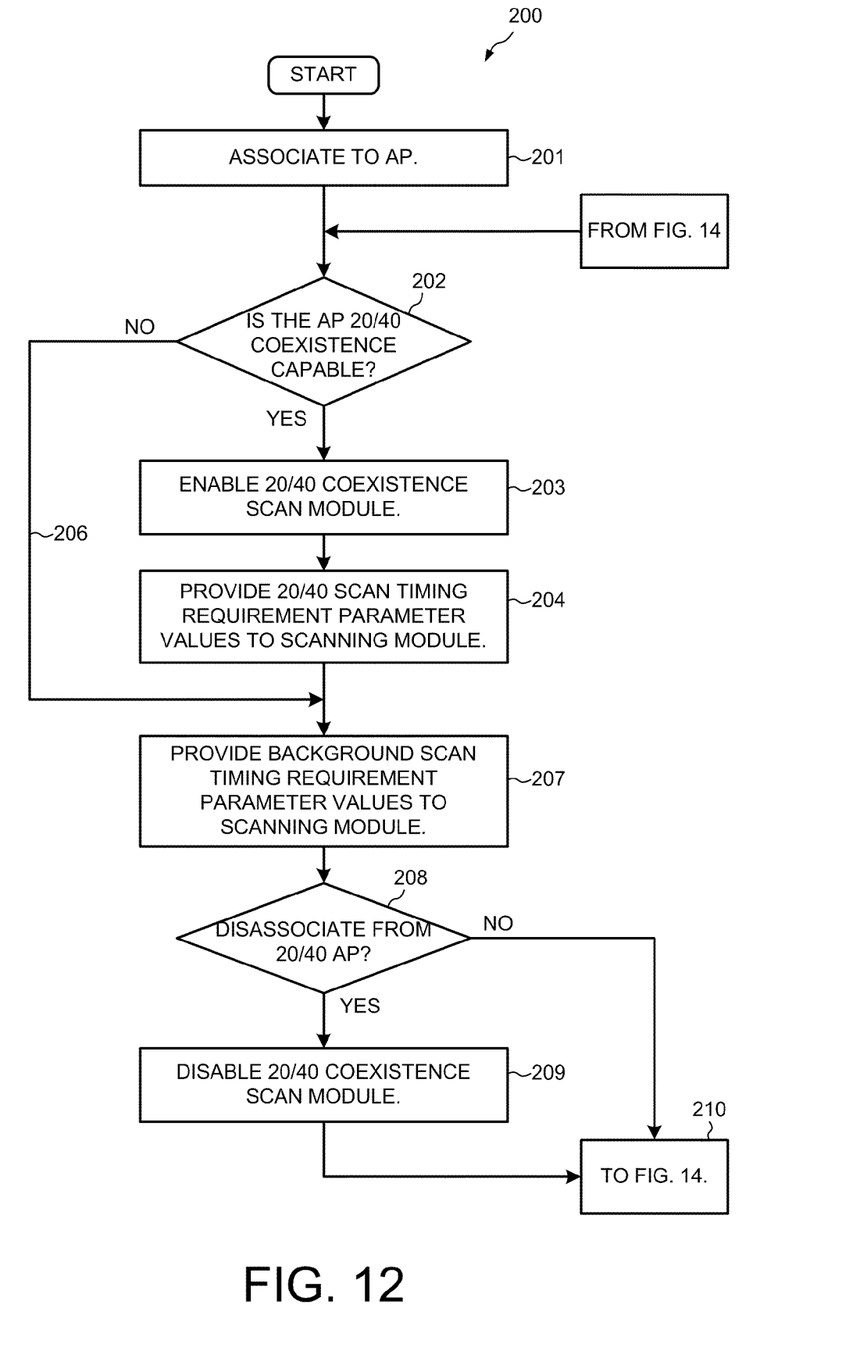
FIG. 12 and FIG. 13 are flowcharts that set forth a method 200 of operation of the software 124 of FIG. 11.
Figure 13:
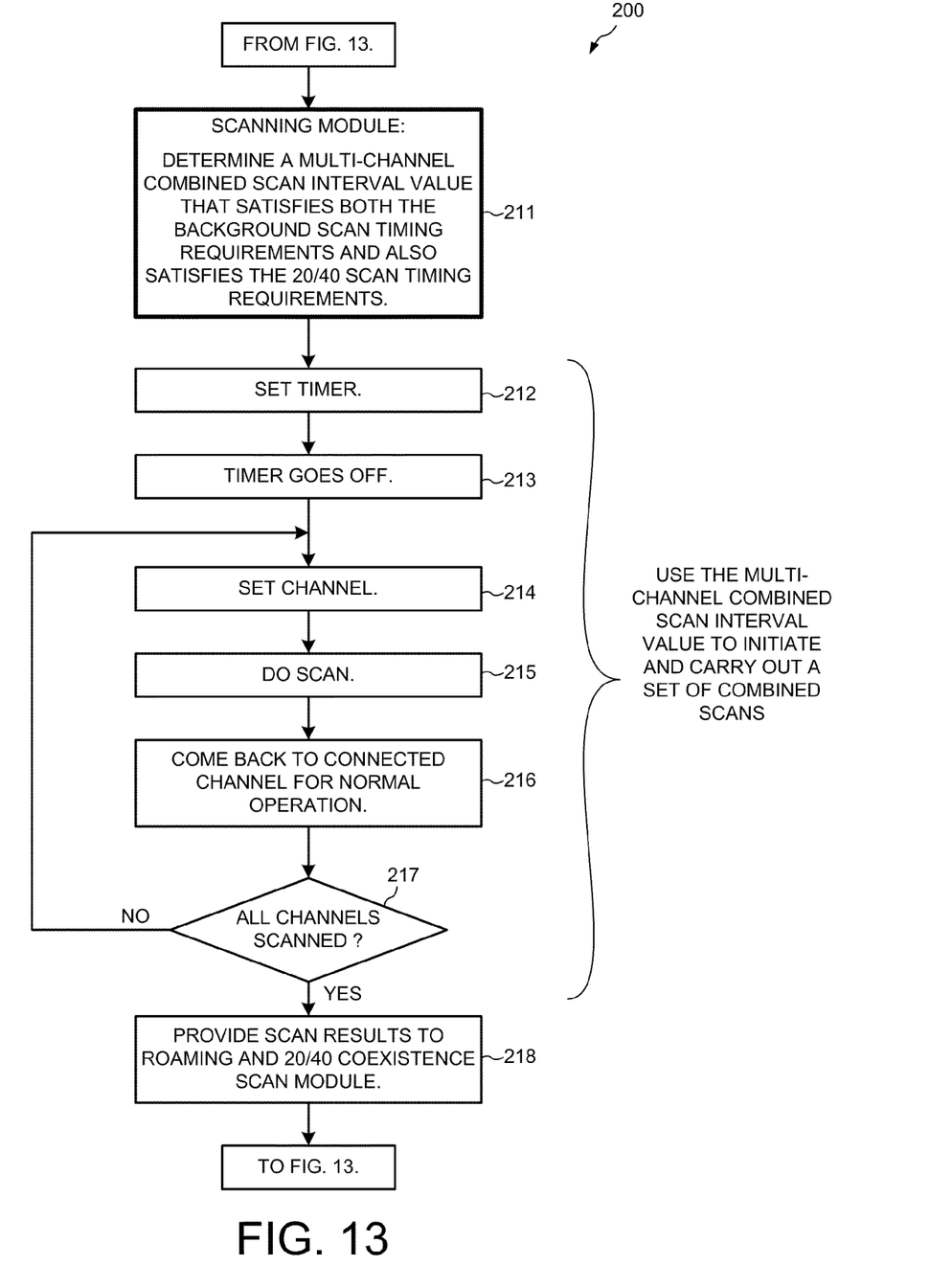

FIG. 12 and FIG. 13 set forth a method 200 of operation of non-AP station 111 and its software 124. Initially, non-AP station 111 powers up and associates (step 201) itself with an AP station in conventional fashion in accordance with the IEEE 802.11(n) protocol. In the present example, non-AP station 111 comes up and connects to AP station 101. Non-AP station 111 then determines whether the AP station to which it has just connected is capable of 20/40 coexistence. The term "20/40 coexistence" as it is used here means that the AP station supports 40 MHz wide channel operation in accordance with IEEE 802.11(n) requirements. Non-AP station 111 determines whether AP station 101 is 20/40 coexistence capable by receiving one or more management frames from AP station 101 and examining these frames to find a bit called the "20/40 BSS Coexistence Management Support" bit.

Figure 14:
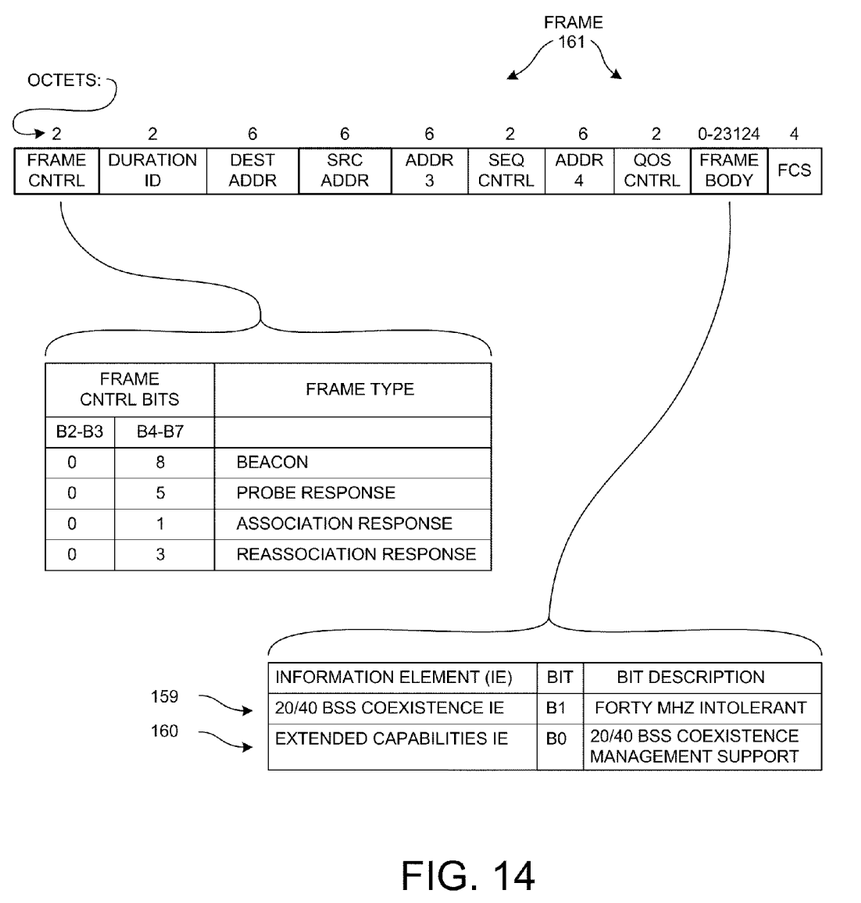
FIG. 14 is a diagram that shows the format of an incoming management frame as received onto non-AP station 111 of FIG. 10. The incoming management frame has both the 40 MHz intolerant bit as well as the 20/40 coexistence management support bit.

FIG. 14 is a diagram that shows the format of an incoming management frame 161 as received from AP station 101. Bits B2 through B7 of the Frame Control field at the beginning of frame 161 indicate the type of frame. If the frame is a beacon frame, a probe response frame, an association response frame, or a reassociation response frame, then the frame is a type of management frame whose Frame Body includes "20/40 BSS Coexistence Management Support" bit 160. As indicated in FIG. 14, this bit is bit B0 in the "Extended Capabilities Information Element" within the Frame Body. The value of the "20/40 BSS Coexistence Management Support" bit indicates whether the sending AP station 101 is capable of 20/40 coexistence operation.

Figure 15:
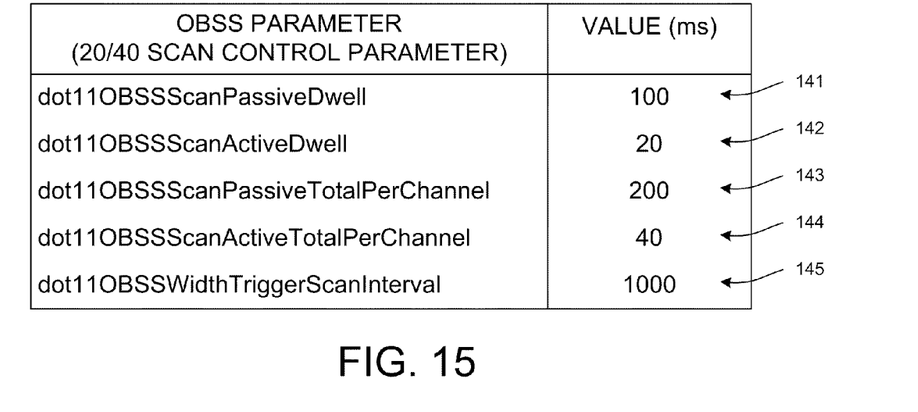
FIG. 15 sets forth five 20/40 scan control parameter values used by the software 124 of FIG. 11.

In addition to the "20/40 BSS Coexistence Management Support" bit 160, each of these four types of management frames (beacon, probe response, association response, and reassociation response) includes five background scan control parameter values as set forth in FIG. 15: 1) a dot11OBSSScanPassiveDwell value 141, 2) a dot11OBSSScanActiveDwell value 142, 3) a dot11OBSSScanPassiveTotalPerChannel value 143, 4) a dot11OBSSScanActiveTotalPerChannel value 144, and 5) a dot11OBSSWidthTriggerScanInterval value 145. The one hundred millisecond dot11OBSSScanPassiveDwell value indicates the time duration of an individual passive 20/40 scan. In a passive 20/40 scan of a channel, the receiver of the non-AP station is set to receive on a particular channel, and one or more incoming frames are received. If the "40 MHz intolerant bit" 159 of an incoming frame from an AP indicates that a 40 MHz intolerant AP station is using the channel, then this "40 MHz intolerance" information is logged into table 132 of the 20/40 coexistence module. Passive scanning, as opposed to active scanning, generally means that the listening non-AP station does not send out a probe request to prompt a response from an AP station, but rather the listening non-AP station merely listens to the channel to receive a beacon if an AP station happens to transmit a beacon on the channel.

When performing scanning, however, the listening non-AP station may not receive an incoming frame within the indicated dwell amount of time. The listening non-AP station may therefore be made to listen for such a dwell amount of time numerous times during one overall 20/40 scan of all channels. The dot11OBSSScanPassiveTotalPerChannel value indicates that total amount of time that the non-AP station is to passive 20/40 scan one channel during the overall 20/40 scan of all channels. If, for example, the dot11OBSSScanPassiveTotalPerChannel value is two hundred milliseconds and the dot11OBSSScanPassiveDwell value is one hundred milliseconds, then if the non-AP station is doing passive 20/40 scans it is to passive 20/40 scan each channel two times, where each passive 20/40 scan time is one hundred milliseconds in duration.

The dot11OBSSScanActiveDwell value and the dot11OBSSScanActiveTotalPerChannel value are used if the non-AP station performs active 20/40 scanning. As set forth above, active scanning involves the non-AP station sending out of probe request frame on the channel, and then waiting for a return probe response frame back from an AP station on that channel. If, for example, the dot11OBSSScanActiveTotalPerChannel value is forty milliseconds and the dot11OBSSScanActiveDwell value is twenty milliseconds, then if the non-AP station is doing active 20/40 scans then the non-AP station is to perform an active 20/40 scan of each channel two times, where each active 20/40 scan time is twenty milliseconds in duration. The last of the five 20/40 scan control parameter values, dot11OBSSWidthTriggerScanInterval, indicates a maximum amount of time between successive multi-channel 20/40 scan operations. Once every multi-channel 20/40 scan interval, each of the channels must be 20/40 scanned in accordance with the timing requirements of the first four 20/40 scan timing requirements 141-144. The 20/40 scan interval parameter value 145 is the maximum amount of time between two such multi-channel 20/40 scan operations.

Returning to the method of FIG. 12, if the "20/40 BSS Coexistence Management Support" bit indicates that AP station 101 is 20/40 coexistence capable (step 202), then bit 133 in the 20/40 coexistence scan module 126 is set (see FIG. 11) and 20/40 coexistence scan module 126 is enabled (step 203). The five 20/40 scan timing requirements parameter values 141-145 obtained from AP station 101 are supplied to scanning module 130. If, however, the AP station 101 to which non-AP station 111 is connected is determined (step 202) not to be 20/40 coexistence capable, then bit 133 (see FIG. 11) in the 20/40 coexistence scan module 126 is not set, 20/40 coexistence scan module 126 is not enabled, and the five scan timing requirements parameter values need not be sent to scanning module 130. Processing proceeds directly to step 207 as indicated by line 206.

In addition to the five 20/40 coexistence scan control parameter values received from AP station 101, there are also five locally-generated background scan control parameter values 146-150. These four locally-generated background scan control parameter values 146-150 are set forth in FIG. 16: 1) a BackgroundScanPassiveDwell value 146, 2) a BackgroundScanActiveDwell value 147, 3) a BackgroundScanPassiveTotalPerChannel value 148, 4) a BackgroundScanActiveTotalPerChannel value 149, and 5) a BackgroundWidthTriggerScanInterval value 150. The one hundred millisecond BackgroundScanPassiveDwell value indicates an amount of time of an individual passive background scan of a channel. A passive background scan involves listening to incoming frames from an AP station, and determining an indication of signal strength. An indication of signal strength of possible links between non-AP station 111 and each of the AP stations 101-103 is determined in the background scanning process. In one method, when an incoming frame is received from an AP station, the RF transceiver 118 gathers signal strength information during the receiving of the incoming frame and returns signal strength values to the hardware abstraction layer module 128. These values are passed through scanning module 130 and to scan results analysis module 135. Module 135 processes these values and determines a RSSI (Received Signal Strength Indication) value for each AP station. The AP station is indicated by the Source Address in the Source Address Field (see FIG. 14) of the associated incoming frame. The RSSI value is then logged in table 136 in the roaming module 127 in association with the source address of the AP station that sent the associated frame. Frames from each AP station are received and processed in this way such that RSSI information for each AP station is collected and logged into table 136.

Figure 16:
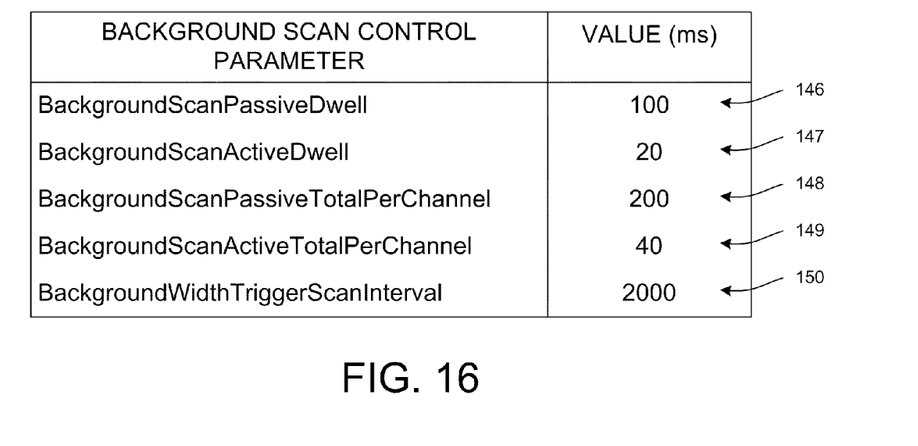
FIG. 16 sets forth five background scan control parameter values used by the software 124 of FIG. 11.

A non-AP station doing background scanning may not, however, receive an incoming frame in the BackgroundScanPassiveDwell amount of time. The listening non-AP station may therefore be made to listen for such a period of time numerous times during one overall background scan of all channels. The BackgroundPassiveTotalPerChannel value indicates that total amount of time that the non-AP station is to passive background scan one channel during the overall background scan of all channels. If, for example, the BackgroundScanPassiveTotalPerChannel value is two hundred milliseconds and the BackgroundOBSSScanPassiveDwell value is one hundred milliseconds, then if the non-AP station is doing passive background scans it is to passive background scan each channel two times, where each passive background scan time is one hundred milliseconds in duration. The BackgroundScanActiveDwell value and the BackgroundScanActiveTotalPerChannel value are used if the non-AP station performs active background scanning. If, for example, the BackgroundScanActiveTotalPerChannel value is forty milliseconds and the BackgroundScanActiveDwell value is twenty milliseconds, then if the non-AP station is doing active background scans it is to active background scan each channel two times, where each active scan time is twenty milliseconds in duration. The last of the five background scan control parameter values, BackgroundWidthTriggerScanInterval, indicates a maximum amount of time between multi-channel background scan operations. All channels are background scanned in accordance with the first four background scan control parameter values 146-149, and this scanning of all channels must occur at least once every "background multi-channel scan interval value" time, wherein the background scan interval time is given by parameter value 150.

Returning to the method 200 of FIG. 12, the five background scan control parameter values 146-150 are provided (step 207) to scanning module 130. In one novel aspect, if the non-AP station 111 becomes disconnected from its AP station 101 (step 208), then 20/40 scanning is disabled (step 209). If non-AP station 111 becomes disconnected from its AP station 101, then non-AP station 111 will not be able to cause its AP station 101 to stop 40 MHz wide channel operation. Accordingly, there is no utility in non-AP station 111 performing 20/40 scanning in such a situation, and 20/40 scanning by non-AP station 111 is disabled. The 20/40 scanning is disabled by clearing 20/40 enable bit 133. At this point in the method 200 of FIG. 12, scanning module 130 has received five 20/40 scan control parameter values 141-145 from 20/40 coexistence scan module 126 (provided that 20/40 scanning is enabled) and has also received five background scan control parameter values 146-150 from roaming module 127. Processing proceeds (step 210) to the steps set forth in FIG. 13.

As shown in FIG. 13, the combined scan timing requirements module 138 (see FIG. 11) applies a function to determine (FIG. 13, step 211) a "multi-channel combined scan interval value" that satisfies both the 20/40 coexistence scan requirements 141-145 as well as the background scan timing requirements 146-150. In this specific embodiment, inputs to this function include: 20/40 multi-channel scan interval value 145, the 20/40 enable bit value, background multi-channel scan interval value 150, and an indication of an amount of data traffic. In one example, if the 20/40 enable bit 133 is not set, then 20/40 scanning is disabled and combined scan timing requirements module 138 ignores the 20/40 scan requirement parameters 141-145. The background scan control parameter values 146-149 are used, and the background multi-channel scan interval value 150 is used to set the scan timer 139. The scanning module 130 is then able to initiate multi-channel combined scan operations at the interval set by the background multi-channel scan interval value 150 without regard to the 20/40 parameters. Each time the scan timer 139 expires, the scanning engine 140 is triggered to perform another multi-channel background scan operation. The scans are referred to as combined scans even though 20/40 coexistence module is disabled in some situations and does not use the scan results returned to it by scanning module 130.

If, however, 20/40 scanning is enabled as indicated by bit 133 being set, then the function applied (FIG. 13, step 211) by combined scan timing requirements module 138 sets the scan parameters 151-155 for a "multi-channel combined 20/40 coexistence and background scan" to be frequent enough to satisfy both the 20/40 requirements 141-145 indicated by the 20/40 coexistence scan module 126 as well as the background timing requirements 146-150 indicated by roaming module 127. In one example, where bit 133 is set, the function causes the "multi-channel combined scan interval value" 155 to be set to be the smaller of the 20/40 multi-channel scan interval value 145 and the background multi-channel scan interval value 150. This ensures that a multi-channel combined scan operation occurs frequently enough that scan results are available frequently enough to satisfy both 20/40 scan requirements and background scan requirements.

In some embodiments, under high data traffic conditions, the function causes background scanning to be performed less frequently. The background multi-channel scan interval value 150 is made to be a function of the amount of data traffic. If the amount of data traffic as indicated by arrow 156 is determined by roaming module 127 to exceed a predetermined amount, then application of the function causes the value 150 to be adjusted and increased in proportion to additional increases in the data traffic amount beyond the predetermined amount. As the amount of data traffic increases and increases beyond the predetermined amount, the required frequency of background scanning decreases and decreases. Arrow 156 represents an indication of the amount of data traffic and the associated adjustment of value 150. Adjustment of value 150 may result in indirect adjustment of the multi-channel combined scan interval value 155 due to operation of the function by which value 155 is determined in scanning module 130.

Returning to FIG. 13, the steps 212-217 represent the use of the combined scan parameter control values determined in step 211. First, scan timer 139 is set (step 212) with the "multi-channel combined scan interval value." When the scan timer 139 expires (step 213), a multi-channel combined scan operation is initiated. The channel to scan is set (step 214) and a combined scan of that channel is performed (step 215). The combined scan may be a passive scan or an active scan. The same incoming management frame (whether obtained as a result of active or passive scanning) yields both the "40 MHz intolerant bit" value for 20/40 coexistence scanning purposes as well as an RSSI signal strength value for background scanning purposes. After a combined scan of a channel (step 215) occurs, the receiver of non-AP station 111 is tuned back to the data traffic channel so that an amount of normal data traffic can be communicated. The duration of normal data traffic operation in step 216 is implementation specific. If all channels have not yet been scanned (step 217), then processing returns to step 214 and a combined scan is performed on the next channel. Once all channels have been scanned in accordance with the four scan control parameter values 151-154 (multiple combined scans of a channel can occur as explained above), then the accumulated scan results are provided both to the 20/40 coexistence scan module 126 (as indicated by arrow 157 in FIG. 13) and to the roaming module 127 (as indicated by arrow 158 in FIG. 13) (step 218). Alternatively, scan results can be reported to the roaming and 20/40 coexistence modules upon each looping of steps 214-217.

Figure 17:
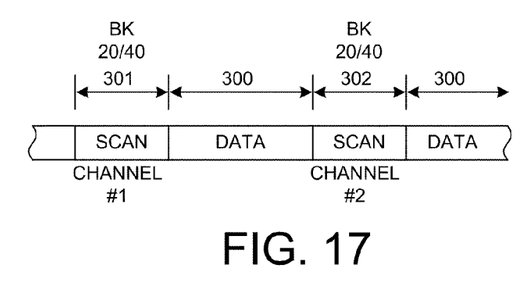
FIG. 17 is a simplified timeline diagram of two combined scans 301 and 302 within a multi-channel combined scan operation 303.

FIG. 17 is a simplified timeline diagram of the resulting combined background and 20/40 coexistence scanning operation. Results of a scan of a channel are used for both background scanning purposes and for 20/40 coexistence scanning purposes. The intervals 300 between such successive ones of these combined scans 301 and 302 is implementation specific. The operation depicted in FIG. 17 is a part of a multi-channel combined scan operation.

Figure 18:
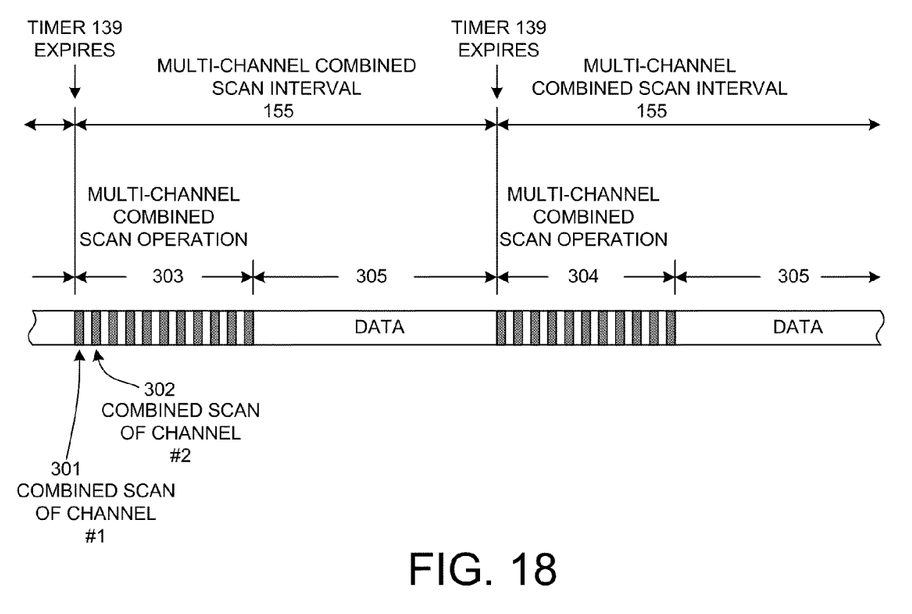
FIG. 18 is a simplified timeline diagram that shows two multi-channel combined scan operations 303 and 304. Each of the multi-channel combined scan operations 303 and 304 is initiated by expiration of scan timer 139 of FIG. 11. The amount of time 305 separating and between successive multi-channel combined scan operations is therefore determined by the "multi-channel combined scan interval value" 155 in the method 200 of FIG. 12 and FIG. 13.

FIG. 18 is a simplified timeline diagram that shows two multi-channel combined scan operations 303 and 304. Each of the multi-channel combined scan operations is initiated by expiration of scan timer 139 of FIG. 11. The amount of time 305 between multi-channel combined scan operations 303 and 304 is therefore set by the "multi-channel combined scan interval value" 155. As illustrated in FIG. 17, within a multi-channel combined scan operation, the individual combined scans of individual channels are separated from one another in time by intervals 300 of ordinary data traffic. The durations of these intervals 300 of ordinary data traffic correspond to time spent in step 216 of the method 200 of FIG. 12 and FIG. 13. At least one combined scan is performed for each of the eleven channels during each of the multi-channel combined scan operations. In some examples, as set forth above, multiple combined scans may be carried out on each channel depending on the values of the combined scan parameters.

In a first novel aspect, the "multi-channel combined scan interval value" 155 is determined by scanning module 130 to be the smaller of the interval values 145 and 150, where interval value 145 is set to be infinitely big (or a maximum value) if the 20/40 enable bit is not set, and where interval value 150 is increased as a function of data traffic if the amount of data traffic exceeds a predetermined data traffic amount. The number of scans performed using the method 200 of FIG. 12 and FIG. 13 is smaller as illustrated in FIG. 17 as compared to the conventional situation of scanning as illustrated in FIG. 6. Because RF transceiver 118 of non-AP station 111 does not have to be set to a different channel and used for scanning so many times in the combined scanning method of FIG. 13 and FIG. 13, the aggregate amount of interruption of data traffic flow on the data traffic channel is reduced as compared to a situation of conventional background and 20/40 scanning where each scan is only used for one purpose and where more total scans are required to satisfy both 20/40 coexistence and background scanning requirements.

In a second novel aspect, if the AP station to which the scanning non-AP station is connected is not 20/40 coexistence capable, then special 20/40 scanning is not performed, thereby reducing power consumption, freeing up processing resources, and increasing data traffic throughput. By clearing 20/40 enable bit 133, the 20/40 scan control parameter values are ignored by scanning module 130 and the 20/40 scan control parameter values do not affect scanning. Scan results 157 may be ignored due to 20/40 coexistence scan module 126 being disabled.

In a third novel aspect, if the non-AP station becomes disconnected from its AP station, then the non-AP station will no longer be able to cause the AP station to stop 40 MHz wide channel operation. Accordingly, 20/40 scanning by the non-AP station is disabled because results of such scanning can no longer be used to affect AP station operation. The mechanism for disabling 20/40 scanning is as described above in that the 20/40 enable bit 133 is cleared and as a result the 20/40 scan control parameter values are ignored by scanning module 130 and do not affect scanning.

In a fourth novel aspect, if data traffic is detected to increase beyond a predetermined amount, then the frequency of background scanning is reduced a commensurate amount to provide more throughput for data traffic. The frequency of background scanning is reduced by increasing the background multi-channel scan interval value 150 as a function of the amount of data traffic.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one specific example, memory 122 of FIG. 10 is a computer-readable medium that stores a program 124 of computer-executable instructions, where processor 121 is a computer, where program 124 is accessed and executed by processor 121 of FIG. 10, and where execution of the program 124 by processor 121 causes non-AP station 111 of FIG. 10 to carry out the method 200 set forth in FIG. 12 and FIG. 13.

Although certain specific embodiments are described above for instructional purposes, the teachings of this patent document have general applicability and are not limited to the specific embodiments described above. The generating of combined scan parameters from a first set of scan parameters for scans of a first type and a second set of scan parameters for scans of a second type is not limited to generating combined scan parameters from 20/40 coexistence scan parameters and background scan parameters, but rather has general applicability and extends to facilitating combined scans involving other types of scans, scan requirements, and scan results. The scanning module disclosed above involving a combined scan timing requirement module and a single scan timer is an efficient way to reduce or eliminate unnecessary scanning and data traffic interruptions. The generating of combined scan parameters is not limited to use in IEEE 802.11(n) systems, but rather applies generally to wireless devices that scan channels in accordance with other communication protocols. The determined combined scan parameter values (for example, the multi-channel combined scan interval value) need not be static, but rather may be adjusted over time based on operating conditions and other factors. The function employed to determine the multi-channel combined scan parameter values 151-155 may involve function input variables other than the enable bit value 133, the 20/40 coexistence scan parameter values 141-145, a data traffic value, and the background scan parameter values 146-150. Although the example described above of the method of generating combined scan parameters involves obtaining a scan result that indicates that a sender station cannot tolerate 40 MHz wide channel usage, the method is not limited to obtaining scan results that indicate this particular 40 MHz intolerance condition. Rather, the method has general applicability and extends to receiving and using scan results that indicate that a sender station cannot tolerate another type of spectrum utilization or operation by other stations. Accordingly, various modifications, adaptations, and combinations of the various features of the described specific embodiments can be practiced without departing from the scope of the claims that are set forth below.

What is claimed is:

1. A method of scanning and communicating with a wireless network by a station, the method comprising:
determining a multi-channel combined scan interval value as a smaller of a first multi-channel scan interval value and a second multi-channel scan interval value by the station, wherein the second multi-channel scan interval value is based on detected data traffic of the wireless network.

2. The method of claim 1, wherein the first multi-channel scan interval value indicates a maximum amount of time between multi-channel scan operations, and wherein each multi-channel scan operation includes at least one scan of each of a plurality of channels.

3. The method of claim 2, wherein the first multi-channel scan interval value is based on a 20/40 multi-channel scan interval value, and wherein the second multi-channel scan interval value is a background multi-channel scan interval value.

4. The method of claim 1, wherein the first multi-channel scan interval value is transmitted from an AP station (Access Point station) and is received onto a non-AP station (non-Access Point station), and wherein the determining the multi-channel combined scan interval value occurs on the non-AP station.

5. The method of claim 1, further comprising:
using the multi-channel combined scan interval value to initiate a plurality of multi-channel scan operations, wherein each multi-channel scan operation involves a plurality of combined scans, wherein determining the multi-channel combined scan interval value is performed by a non-AP station (non-Access Point station), wherein each of the plurality of multi-channel scan operations is performed by the non-AP station, and wherein an interval of time between two successive ones of the multi-channel scan operations is determined at least in part on the multi-channel combined scan interval value.

6. The method of claim 5, wherein the first multi-channel scan interval value indicates a first scanning parameter for the non-AP station, wherein the second multi-channel scan interval value indicates a second scanning parameter for the non-AP station, and wherein the multi-channel combined scan interval value is determined and is used such that both the first and second scanning parameters for the non-AP station are satisfied.

7. The method of claim 5, wherein the first multi-channel scan interval value is a BSS (Basic Service Set) Width Trigger Scan Interval value, and wherein determining the multi-channel combined scan interval value further comprises ignoring the first multi-channel scan interval value when the non-AP station is not connected to a 20/40 capable AP station (Access Point station).

8. The method of claim 5, further comprising:
disabling a 20/40 coexistence scanning capability of the non-AP station when the non-AP station is not connected to a 20/40 capable AP station.

9. The method of claim 5, further comprising:
adjusting the second multi-channel scan interval value based on an amount of data traffic handled by the non-AP station.

10. The method of claim 1, further comprising:
using the multi-channel combined scan interval value to initiate a plurality of combined scans, and wherein determining the multi-channel combined scan interval value and using the multi-channel combined scan interval value are performed by a non-Access Point station.

11. The method of claim 1, further comprising:
using the multi-channel combined scan interval value to initiate a plurality of combined scans, wherein at least one of the combined scans involves receiving a frame, examining a 40 megahertz (MHz) intolerant bit within the frame, and making a signal strength determination, and wherein determining the multi-channel combined scan interval value and using the multi-channel combined scan interval value are performed by a non-Access Point station.

12. An apparatus configured to perform a plurality of scans, wherein at least one of the plurality of scans includes:
receiving a frame onto the apparatus;

examining a 40 megahertz (MHz) intolerant bit within the frame;

determining a multi-channel combined scan interval value to be a smaller of a first multi-channel scan interval value and a second multi-channel scan interval value when the 40 MHz intolerant bit indicates a first value; and making a background scan determination based on at least information gathered as a result of the receiving of the frame and detected data traffic when the 40 MHz intolerant bit indicates a second value.

13. The apparatus of claim 12, wherein the background scan determination is a signal strength determination, wherein the apparatus is adapted to function as a first station in a wireless network, and wherein the frame is transmitted from a second station in the wireless network.

14. An apparatus for communicating with a wireless network, the apparatus comprising:

a wireless transceiver mechanism over which a 20/40 scan requirement parameter value is received onto the apparatus; and a computing mechanism that is configured to determine a multi-channel combined scan interval value based at least in part on detected data traffic of the wireless network, a background scan requirement parameter value and the 20/40 scan requirement parameter value, and wherein the multi-channel combined scan interval value is determined to be a smaller of the 20/40 scan requirement parameter value and the background scan requirement parameter value.

15. The apparatus of claim 14, wherein the computing mechanism is also configured to use the multi-channel combined scan interval value to initiate a multi-channel combined scan operation that includes:

receiving a frame;

examining a 40 megahertz (MHz) intolerant bit within the frame;

making a signal strength determination; and performing at least one combined scan of each of a plurality of channels.

16. The apparatus of claim 14, wherein the computing mechanism includes a 20/40 coexistence scan module, wherein the 20/40 coexistence scan module is disabled when the apparatus is not connected to a 20/40 capable Access Point station (AP station), and wherein the 20/40 coexistence scan module is enabled when the apparatus is connected to a 20/40 capable AP station.

17. The apparatus of claim 14, wherein the computing mechanism adjusts the multi-channel combined scan interval as a function of an amount of data traffic handled by the apparatus.

18. An apparatus for communicating with a wireless network, the apparatus comprising:

a wireless transceiver mechanism over which a 20/40 scan requirement parameter value is received onto the apparatus; and means for determining a multi-channel combined scan interval value based at least in part on detected data traffic of the wireless network, a background scan requirement parameter value and the 20/40 scan requirement parameter value, wherein the multi-channel combined scan interval value is determined to be a smaller of the 20/40 scan requirement parameter value and the background scan requirement parameter value.

19. The apparatus of claim 18, wherein the means for determining includes a MAC and PHY layer hardware core, a processor, and a memory that stores a set of processor-executable instructions that is executed by the processor.

20. The apparatus of claim 18, wherein the means for determining is configured to use the multi-channel combined scan interval value to initiate a multi-channel combined scan operation, and wherein the multi-channel combined scan operation includes:

performing a scan of a channel to obtain a scan result; and using the scan result to make a 20/40 coexistence determination and to make a background scan determination.

21. A non-transitory computer-readable storage medium storing instructions executable by a processor to perform operations comprising:

determining a multi-channel combined scan interval value based at least in part on detected data traffic, a background scan requirement parameter value and a 20/40 scan requirement parameter value, wherein the multi-channel combined scan interval value is determined to be a smaller of the 20/40 scan requirement parameter value and the background scan requirement parameter value.

22. The non-transitory computer-readable storage medium of claim 21, wherein the operations further comprise:

disabling a 20/40 coexistence scanning functionality of an apparatus in response to the apparatus no longer being connected to a 20/40 capable Access Point station (AP station).

23. The non-transitory computer-readable storage medium of claim 22, wherein the operations further comprise:

adjusting the multi-channel combined scan interval value as a function of an amount of data traffic handled by the apparatus.

24. The non-transitory computer-readable storage medium of claim 21, wherein the operations further comprise:

using the multi-channel combined scan interval value to initiate a multi-channel combined scan operation, wherein the multi-channel combined scan operation includes:

performing a scan of a channel to obtain a scan result; and using the scan result to make a 20/40 coexistence determination and to make a background scan determination.

* * * * *